(12) United States Patent
Zhang (10) Patent No.: US 10,785,057 B2
(45) Date of Patent: Sep. 22, 2020

(54) PROGRAMMABLE AND RECONFIGURABLE FRAME PROCESSOR

(71) Applicant: Wuhan Syntek Ltd., Wuhan (CN)

(72) Inventor: Kefeng Zhang, Wuhan (CN)

( * ) Notice: Subject to any disclaimer, the term of this patent is extended or adjusted under 35 U.S.C. 154(b) by 13 days.

(21) Appl. No.: 16/114,291

(22) Filed: Aug. 28, 2018

(65) Prior Publication Data

US 2018/0375688 A1   Dec. 27, 2018

Related U.S. Application Data (63) Continuation of application No. PCT/CN2016/077369, filed on Mar. 25, 2016.

(30) Foreign Application Priority Data

Mar. 12, 2016 (CN) .......................... 2016 1 0140216

(51) Int. Cl.
 H04L 12/50 (2006.01)
 H04L 29/06 (2006.01)

(52) U.S. Cl.
 CPC .............. *H04L 12/50* (2013.01); *H04L 69/22* (2013.01)

(58) Field of Classification Search
 CPC ................................ H04L 69/22; H04L 12/50
 See application file for complete search history.

(56) References Cited

U.S. PATENT DOCUMENTS

| | | | | |
|---|---|---|---|---|
| 7,187,694 B1 * | 3/2007 | Liao | ......................... | H04L 69/22 370/474 |
| 7,818,389 B1 * | 10/2010 | Chiang | .................... | H01M 4/92 709/212 |
| 8,937,942 B1 * | 1/2015 | Li | ........................ | H04L 67/1097 370/386 |
| 10,473,993 B2 * | 11/2019 | Hao | ...................... | G02F 1/13439 |
| 10,476,993 B2 * | 11/2019 | Quin | ...................... | H04L 41/069 |
| 2004/0208181 A1 * | 10/2004 | Clayton | .................. | H04L 47/50 370/395.4 |

(Continued)

FOREIGN PATENT DOCUMENTS

| CN | 101206687 A | 6/2008 |
|---|---|---|
| CN | 102394732 A | 3/2012 |

(Continued)

OTHER PUBLICATIONS

Internation Search Report of PCT/CN2016/077369, dated Dec. 12, 2016.

*Primary Examiner* — Redentor Pasia
(74) *Attorney, Agent, or Firm* — Andrew C. Cheng (57) ABSTRACT

A programmable and reconfigurable frame processor comprises: a first data processing unit; a first state machine connected to the first data processing unit; a second data processing unit; a second state machine connected to the second data processing unit; and a master state machine respectively connected to the first and second state machines. The first and second data processing units each comprises a frame structure description table for storing a frame header address pointer, a frame tail address pointer and values of respective sections specified in a communication protocol. The first state machine, the second state machine and the master state machine each comprises a protocol state structure description table for storing a header address pointer, a tail address pointer and state transition values.

12 Claims, 9 Drawing Sheets

(56) References Cited

U.S. PATENT DOCUMENTS

| | | | | |
|---|---|---|---|---|
| 2007/0169179 A1* | 7/2007 | Narad | ............... | G06F 9/30029 |
| | | | | 726/4 |
| 2007/0253430 A1* | 11/2007 | Minami | ............. | H04L 12/2898 |
| | | | | 370/395.52 |
| 2008/0008202 A1* | 1/2008 | Terrell | ................... | H04L 45/00 |
| | | | | 370/401 |
| 2013/0084063 A1* | 4/2013 | Hu | ........................ | H04L 49/10 |
| | | | | 398/2 |
| 2015/0043330 A1* | 2/2015 | Hu | ...................... | H04L 49/557 |
| | | | | 370/225 |
| 2015/0124826 A1* | 5/2015 | Edsall | .................... | H04L 45/66 |
| | | | | 370/392 |
| 2017/0063690 A1* | 3/2017 | Bosshart | ............... | H04L 69/22 |

FOREIGN PATENT DOCUMENTS

| CN | 102647414 A | 8/2012 |
|---|---|---|
| CN | 102916967 A | 2/2013 |

\* cited by examiner

PROGRAMMABLE AND RECONFIGURABLE FRAME PROCESSOR

CROSS-REFERENCE TO RELATED APPLICATIONS

This application is a continuation of International Patent Application No. PCT/CN2016/077369 with a filing date of Mar. 25, 2016, designating the United States, now pending, and further claims priority to Chinese Patent Application No. 201610140216.7 with a filing date of Mar. 12, 2016. The content of the aforementioned applications, including any intervening amendments thereto, are incorporated herein by reference.

TECHNICAL FIELD

The disclosure relates to a technical field of data communication and digital integrated circuits, and more particularly to a programmable and reconfigurable frame processor.

BACKGROUND OF THE PRESENT INVENTION

Any one of current data processors can only identify limited types of data protocols. However, various new protocols appear constantly, and the original protocols are also upgraded and modified constantly, along with the development of technology. The current data processors aren't adaptive to the upgrade and modifications of the protocols, and certainly not adaptive to the new protocols. As a result, a new processor should be designed accordingly if an upgraded or new communication protocol appears.

Therefore, with the current technology, the processors have the disadvantages that they aren't adaptive to the changes of the protocols and the cost of upgrade and reconstruction is large.

SUMMARY OF PRESENT INVENTION

Aiming at the problems in the prior art that the traditional processors aren't adaptive to the changes of the protocols and the cost of upgrade and reconstruction is large, an objective of the present disclosure is to provide a programmable and reconfigurable frame processor.

The technical solutions adopted by the disclosure are as follows.

In one aspect, a programmable and reconfigurable frame processor is provided, which comprises: a first data processing unit configured to receive a frame/packet from a lower-layer protocol and send a processed frame/packet to an upper-layer protocol; a first state machine connected to the first data processing unit and configured to control operation of the first data processing unit through a finite state transition table; a second data processing unit configured to receive a frame/packet from the upper-layer protocol and send a processed frame/packet to the lower-layer protocol; a second state machine connected to the second data processing unit and configured to control operation of the second data processing unit through the finite state transition table; and a master state machine respectively connected to the first and second state machines and configured to control operation of the first and second state machines through the finite state transition table; the first and second data processing units each comprises a frame structure description table for storing a frame header address pointer, a frame tail address pointer and values of respective sections specified in a communication protocol; the first state machine, the second state machine and the master state machine each comprises a protocol state structure description table for storing a header address pointer, a tail address pointer and state transition values.

Advantageously, the programmable and reconfigurable frame processor further comprises: an upper loopback bridge respectively connected to the first and second data processing units and the master state machine and configured to bridge between the first and second data processing units under the control of the master state machine, so as to make the frame/packet from the upper-layer protocol processed by the second data processing unit, the upper loopback bridge and the first data processing unit and then sent to the upper-layer protocol.

Advantageously, the programmable and reconfigurable frame processor further comprises: a lower loopback bridge respectively connected to the first and second data processing units and the master state machine and configured to bridge between the first and second data processing units under the control of the master state machine, so as to make the frame/packet from the lower-layer protocol processed by the first data processing unit, the lower loopback bridge and the second data processing unit and then sent to the lower-layer protocol.

Advantageously, the first data processing unit comprises: a first switch configured to switch on or off the receiving and transmitting of the frame/packet of the first data processing unit; a first frame header switch connected to the first switch and configured to switch on or off the receiving and transmitting of the frame header; a first frame header processing module respectively connected to the first frame header switch and the first state machine and configured to process the frame header under the control of the first state machine; a first frame data switch connected to the first switch and configured to switch on or off the receiving and transmitting of the frame data; a first frame data processing module respectively connected to the first frame data switch and the first state machine and configured to process the frame data under the control of the first state machine; a first check switch connected to the first switch and configured to switch on or off the receiving and transmitting of the check data; and a first check module respectively connected to the first check switch and the first state machine and configured to process the check data under the control of the first state machine.

Advantageously, the frame structure description table is included in the first frame header processing module.

Advantageously, the second data processing unit comprises: a second switch configured to switch on or off the receiving and transmitting of the frame/packet of the second data processing unit; a second frame header switch connected to the second switch and configured to switch on or off the receiving and transmitting of the frame header; a second frame header processing module respectively connected to the second frame header switch and the second state machine and configured to process the frame header under the control of the second state machine; a second frame data switch connected to the second switch and configured to switch on or off the receiving and transmitting of the frame data; a second frame data processing module respectively connected to the second frame data switch and the second state machine and configured to process the frame data under the control of the second state machine; a second check switch connected to the second switch and configured to switch on or off the receiving and transmitting of the check data; and a second check module respectively connected to the second check switch and the second state machine and configured to process the check data under the control of the second state machine.

Advantageously, the frame structure description table is included in the second frame header processing module.

Advantageously, the first frame header processing module comprises: a first checksum circuit configured for checksum of the data pointed from the frame header address pointer to the frame tail address pointer in order to determine whether to receive the current frame/packet; and a first condition receiving circuit configured to further determine whether to receive the current frame/packet; the first condition receiving circuit comprises: a first FIFO register configured to store the frame header address pointer, the frame tail address pointer and values of respective sections specified in a communication protocol; a second FIFO register configured to store the frame header address pointer, the frame tail address pointer and masks of respective sections specified in a communication protocol; and a first arithmetic unit configured to calculate the frame header, the values of respective sections specified in the communication protocol and masks of respective sections specified in the communication protocol of the frame/packet to be received, and output the calculated result to determine whether to receive the current frame/packet.

Advantageously, the second frame header processing module comprises: a second checksum circuit configured for checksum of the data pointed from the frame header address pointer to the frame tail address pointer in order to determine whether to receive the current frame/packet; and a second condition receiving circuit configured to further determine whether to receive the current frame/packet; the second condition receiving circuit comprises: a third FIFO register configured to store the frame header address pointer, the frame tail address pointer and values of respective sections specified in a communication protocol; a fourth FIFO register configured to store the frame header address pointer, the frame tail address pointer and masks of respective sections specified in a communication protocol; and a second arithmetic unit configured to calculate the frame header, the values of respective sections specified in the communication protocol and masks of respective sections specified in the communication protocol of the frame/packet to be received, and output the calculated result to determine whether to receive the current frame/packet.

Advantageously, the first state machine, the second state machine and the master state machine each further comprises a state transition judging module for determining the condition to transfer from one state to a next state; the state transition judging module comprises: a code value input circuit configured to provide a reconfigurable code value; and a logical operation circuit configured for logical operation based on the code value provided by the code value input circuit and outputting the operated result to determine whether to transfer to the next state.

Advantageously, the code value comprises: an operation code value for determining the logical operation type of the logical operation circuit; a current triggering event source code value for representing a current event source; and a target event source code value for representing a target event source.

Advantageously, the programmable and reconfigurable frame processor further comprises: a programmable timing sequence generator for providing a timing sequence signal for the first and second state machine; the programmable timing sequence generator comprises: a counter; a relative delay output module connected to the counter configured to provide a standardized data transmitting timing sequence based on the configured relative delay value, wherein the relative delay value includes a before-data-transmission delay time, an after-data-transmission delay time, a frame protection time and a channel cycle; and an independent delay output module connected to the counter configured to provide at least one independent delay time based on the configured independent delay value in order to provide a data receiving timing sequence.

The following advantages can be achieved by implementing the present disclosure. The present disclosure uses the frame structure description tables and the protocol state structure description tables to realize reconfiguration of the values of the respective sections specified by the protocol and the state of the protocol, thereby enabling the processor to be adaptive to a change of the protocol, increasing compatibility of the processor, and reducing costs required for reconfiguring the processor. In addition, the processor in the present disclosure can adapt to communication protocols of any timing sequence mechanisms and channel timing division mechanisms by standardizing the timing sequence to send the data. Users can change the timing sequence mechanism and the channel timing division mechanism of the processor only by simply reset the relative delay values of the relative delay output module. The self-loopback detection of the processor can be realized by configuring the upper loopback bridge. And the detection for lower-layer devices can be realized by configuring the lower loopback bridge.

DESCRIPTION OF THE DRAWINGS

In order to make the technical solutions in the disclosure or in the prior art described more clearly, the drawings associated to the description of the embodiments or the prior art will be illustrated concisely hereinafter. Obviously, the drawings described below are only some embodiments according to the disclosure. Numerous drawings therein will be apparent to one of ordinary skill in the art based on the drawings described in the disclosure without creative efforts.

DETAILED DESCRIPTION OF PREFERRED EMBODIMENTS

The technical schemes in the embodiments of the disclosure will be described clearly and thoroughly with reference to the accompanying drawings and embodiments in the following. Obviously, the embodiments described below are only partial but not the whole of the embodiments of the disclosure. Any other embodiments obtained by the skilled in the art in the light of these embodiments without creative efforts should fall into the scope of the disclosure.

The First Embodiment: A Processor

Figure 1:
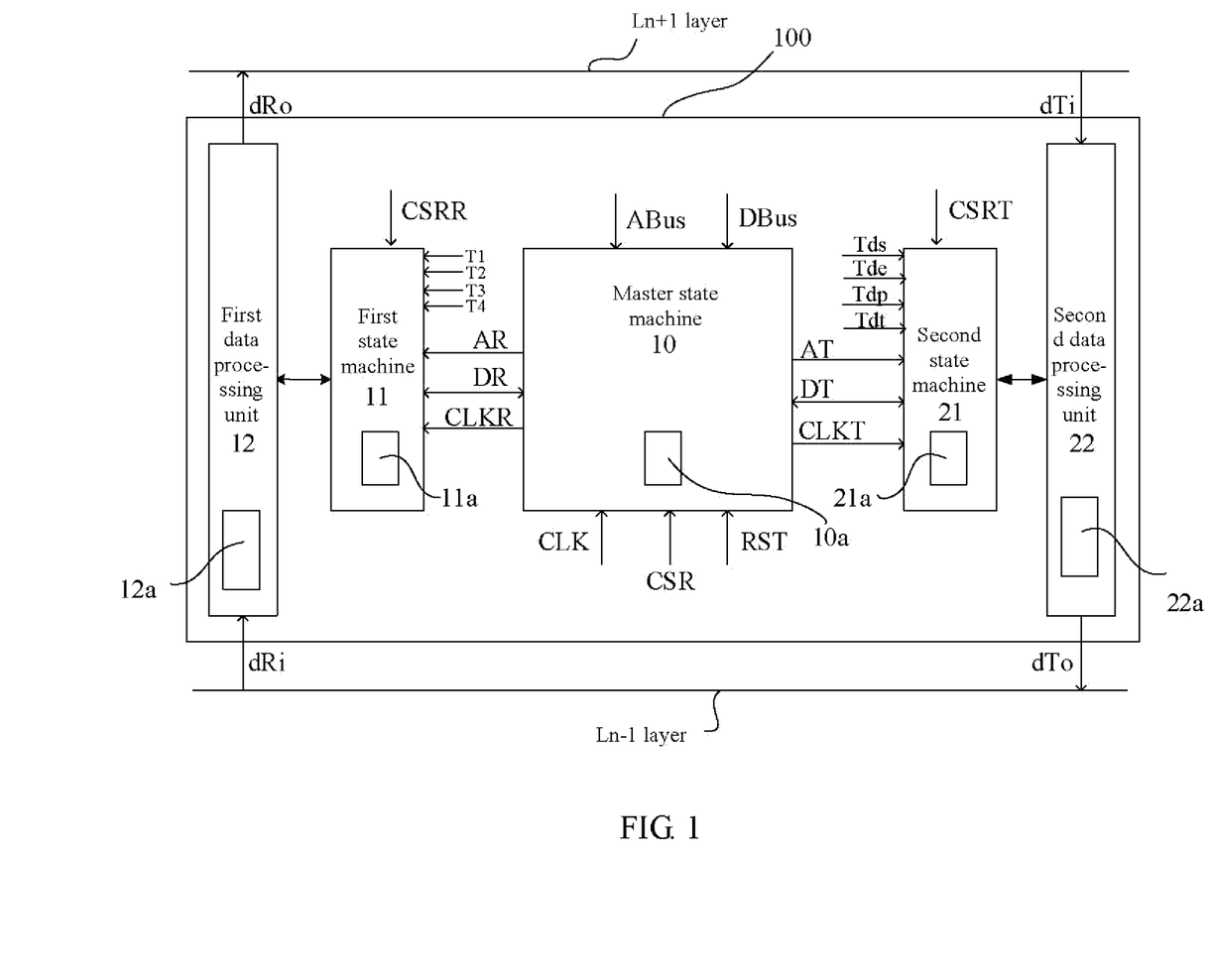
FIG. 1 is a structural schematic diagram of a processor according to a first embodiment of the present disclosure.

Referring to FIG. 1, a programmable and reconfigurable frame processor 100 is provided, the processor 100 comprises: a first data processing unit 12 configured to receive a frame or packet from a lower-layer (Ln−1 layer) protocol and send a processed frame or packet to an upper-layer (Ln+1 layer) protocol; a first state machine 11 connected to the first data processing unit 12 configured to control the operation of the first data processing unit 12 through a finite state transition table; a second data processing unit 22 configured to receive a frame or packet from the upper-layer protocol and send a processed frame or packet to the lower-layer protocol; a second state machine 21 connected to the second data processing unit 22 and configured to control the operation of the second data processing unit 22 through the finite state transition table; and a master state machine 10 respectively connected to the first and second state machines 11 and 21 and configured to control the control operation of the first and second state machines 11 and 21 through the finite state transition table; the first and second data processing units 12 and 22 respectively comprise frame structure description tables 12a and 22a for storing a frame header address pointer, a frame tail address pointer and values of respective sections specified in a communication protocol; the first state machine 11, the second state machine 21 and the master state machine 10 respectively comprise protocol state structure description tables 11a, 21a and 10a for storing a header address pointer, a tail address pointer and state transition values.

In the embodiment, the operating principle of the processor 100 is as follows.

The master state machine 10 acquires necessary data and instructions through an address bus ABus and a data bus DBus, and sends different control signals to the first and second state machines through the finite state transition tables. In the figures, CLK is a clock signal of the master state machine 10, CSR is a state word signal of the master state machine 10, and RST is a reset signal of the master state machine 10. The master state machine 10 comprises a protocol state structure description table 10a for storing a header address pointer, a tail address pointer and the state transition value. Therefore, the reconfiguration of the state transition value in the master state machine 10 can be realized by configuring the values of the frame header address pointer and the frame tail address pointer.

The first state machine 11, the second state machine 21 and the master state machine 10 can have a same structure. The first and second state machines 11 and 21 perform state transitions under the control of the master state machine 10, and further control the operations of the first and second data processing units 12 and 22 respectively. Wherein, CLKR and CLKT are respectively the clock signals of the first and second state machines 11 and 21, AR and AT are respectively the address buses of the first and second state machines 11 and 21, and DR and DT are respectively the data buses of the first and second state machines. CSRR and CSRT are respectively the state control word signals of the first and second state machines. The first and second state machines 11 and 21 respectively comprise frame structure description tables 11a and 21a. Therefore, the state transition values of the first and second state machines 11 and 21 are also reconfigurable, and the finite state transition tables of the first and second state machines 11 and 21 are adaptive to different communication protocols.

The first and second data processing units 12 and 22 can also have a same structure. The frame structure description tables 12a and 22a store the values of respective sections specified in the communication protocol, so the communication protocol data in the frame structure description tables 12a and 22a are also reconfigurable.

The reconfiguration of the protocol state transitions and the values of respective sections specified in the protocol can be realized by the frame structure description tables and the protocol state structure description tables, therefore enabling to identify any protocols. Besides, two data processing units are provided in the present disclosure for respectively receiving data from a certain layer and sending data to the certain layer. That is to say, for a specific layer, two independent data processing units are provided in the processor in the present disclosure to perform the data reception and transmission respectively, thus enabling the transition between the same-layer protocols.

Specifically, there are 8 kinds of data processing modes in the processor of the embodiment, the detailed signal flows are as follows.

Mode 1: dRi→the first data processing unit 12→dRo. Namely, the input data dRi sent by the Ln−1 protocol layer is processed by the first data processing unit 12 and output as the output data dRo to the Ln+1 protocol layer. This processing mode is mainly used for frame relay or transmission, route and so on.

Mode 2: dTi→the second data processing unit 22→dTo. Namely, the input data dTi sent by the Ln+1 protocol layer is processed by the second data processing unit 22 and output as the output data dTo to the Ln−1 protocol layer. This processing mode is mainly used for frame relay or transmission, route and so on.

Mode 3: dRi→the first data processing unit 12→the first state machine 11→the master state machine 10. Namely, the input data dRi sent by the Ln−1 protocol layer is processed by the first data processing unit 12 and the first state machine 11 and then sent to the master state machine 10. This processing mode is mainly used for sending a control instruction or reaction from the Ln−1 protocol layer to the master state machine 10.

Mode 4: the master state machine 10→the first state machine 11→the first data processing unit 12→dRo. Namely, the output data dRo is sent by the master state machine 10 to the Ln+1 layer through the first state machine 11 and the first data processing unit 12. This processing mode is mainly used for sending a control instruction or reaction from the master state machine 10 to the Ln+1 protocol layer.

Mode 5: dTi→the second data processing unit 22→the second state machine 21→the master state machine 10. Namely, the input data dTi sent by the Ln+1 protocol layer is processed by the second data processing unit 22 and the second state machine 21 and then sent to the master state machine 10. This processing mode is mainly used for sending a control instruction or reaction from the Ln+1 protocol layer to the master state machine 10.

Mode 6: the master state machine 10→the second state machine 21→the second data processing unit 22→dTo. Namely, the output data dTo is sent by the master state machine 10 to the Ln−1 layer through the second state machine 21 and the second data processing unit 22. This processing mode is mainly used for sending a control instruction or reaction from the master state machine 10 to the Ln−1 protocol layer.

Mode 7: dRi→the first data processing unit 12→the first state machine 11→the master state machine 10→the second state machine 21→the second data processing unit 22→dTo. Namely, the data dRi input by the Ln−1 protocol layer is successively processed by the first data processing unit 12, the first state machine 11, the master state machine 10, the second state machine 21 and the second data processing unit 22, and then output to the Ln−1 layer as the output data dTo. This processing mode is mainly used for protocol transition and Ln−1 protocol layer detection. In other words, the data input by the Ln−1 protocol layer may be based on the A protocol, and the data sent back to the Ln−1 protocol layer after being processed by the processor can be based on the B protocol. Of course, instead of transforming protocols, it also can be used to detect whether the lower layer of the processor is normally working. For example, it can be detected by the processor that whether the physical layer is working normally if the processor is working at the MAC (Media Access Control) layer.

Mode 8: dTi→the second data processing unit 22→the second state machine 21→the master state machine 10→the first state machine 11→the first data processing unit 12→dRo. Namely, the data dTi input by the Ln+1 protocol layer is successively processed by the second data processing unit 22, the second state machine 21, the master state machine 10, the first state machine 11 and the first data processing unit 12, and then output to the Ln+1 layer as the output data dRo. This processing mode is mainly used for protocol transition and self-loopback detection. In other words, it can be detected through the mode that whether the processor is working normally.

It should be understood that, in the present application, the protocol layer where the processor locates can be any layer, such as physical layer, MAC layer, IP layer, TCP layer or application layer. Therefore, the processor in the present application is universal.

It also should be understood that, in the present disclosure, the expressions like "the first", "the second", "the third", "the fourth" and so on aren't used to limit the sequence, but only used to identify the names of the parts.

The Second Embodiment: A Processor

Figure 2:
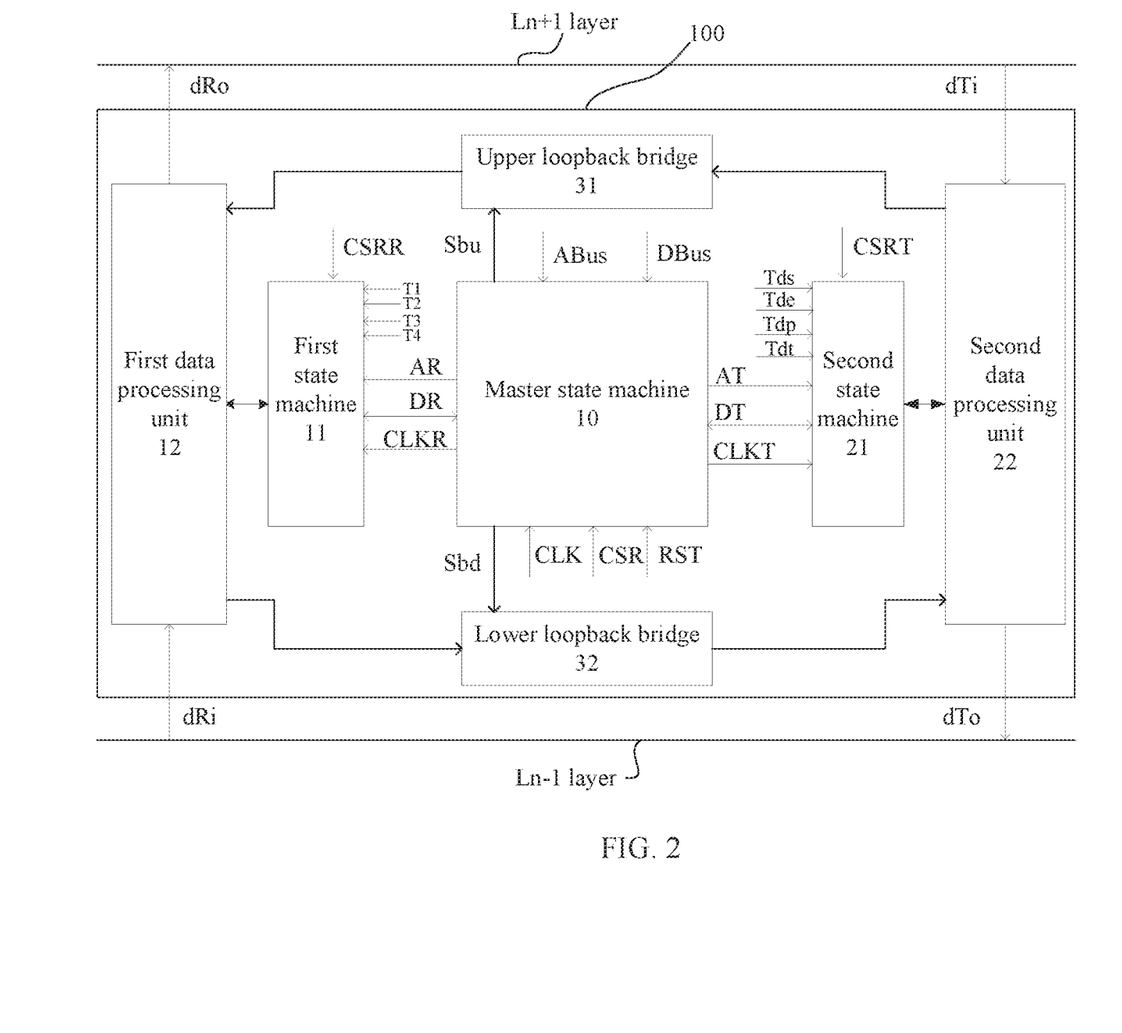
FIG. 2 is a structural schematic diagram of a processor according to a second embodiment of the present disclosure.

Referring to FIG. 2, another processor 100 is provided in the embodiment, an upper loopback bridge 31 and a lower loopback bridge 32 are added compared to the first embodiment.

The upper loopback bridge 31 is respectively connected to the first data processing unit 12, the second data processing unit 22 and the master state machine 10, which is used for realizing between the first and second data processing units 12 and 22 under the control of the control signal Sbu of the master state machine 10, so as to make the data dTi from the upper layer processed by the second data processing unit 22, the upper loopback bridge 31 and the first data processing unit 12 and then sent to the upper layer as the output data dRo.

The lower loopback bridge 32 is respectively connected to the first data processing unit 12, the second data processing unit 22 and the master state machine 10, which is used for realizing between the first and second data processing units 12 and 22 under the control of the control signal Sbd of the master state machine 10, so as to make the data dRi from the lower layer processed by the first data processing unit 12, the lower loopback bridge 32 and the second data processing unit 22 and then sent to the lower layer as the output data dTo.

As a result, the processor in the embodiment has two other data processing modes despite the eight kinds of data processing modes described in the first embodiment. The detailed signal flows are as follows.

Mode 9: dRi→the first data processing unit 12→the lower loopback bridge 32→the second data processing unit 22→dTo. Namely, the data dRi sent by the Ln−1 layer is processed by the first data processing unit 12, the lower loopback bridge 32 and the second data processing unit 22, and then sent back to the Ln−1 protocol layer. This processing mode is mainly used for the protocol transition for lower-layer data and the lower-layer detection.

Mode 10: dTi→the second data processing unit 22→the upper loopback bridge 31→the first data processing unit 12→dRo. Namely, the data dTi sent by the Ln+1 protocol layer is processed by the second data processing unit 22, the upper loopback bridge 31 and the first data processing unit 12, and then sent back to the Ln+1 protocol layer. This processing mode is mainly used for the protocol transition for upper-layer data and the self-loopback detection for the processor.

The portions not mentioned in the embodiment and not shown in FIG. 2 are similar to the first embodiment, which will not be described again.

The Third Embodiment: A Data Processing Unit

Figure 3:
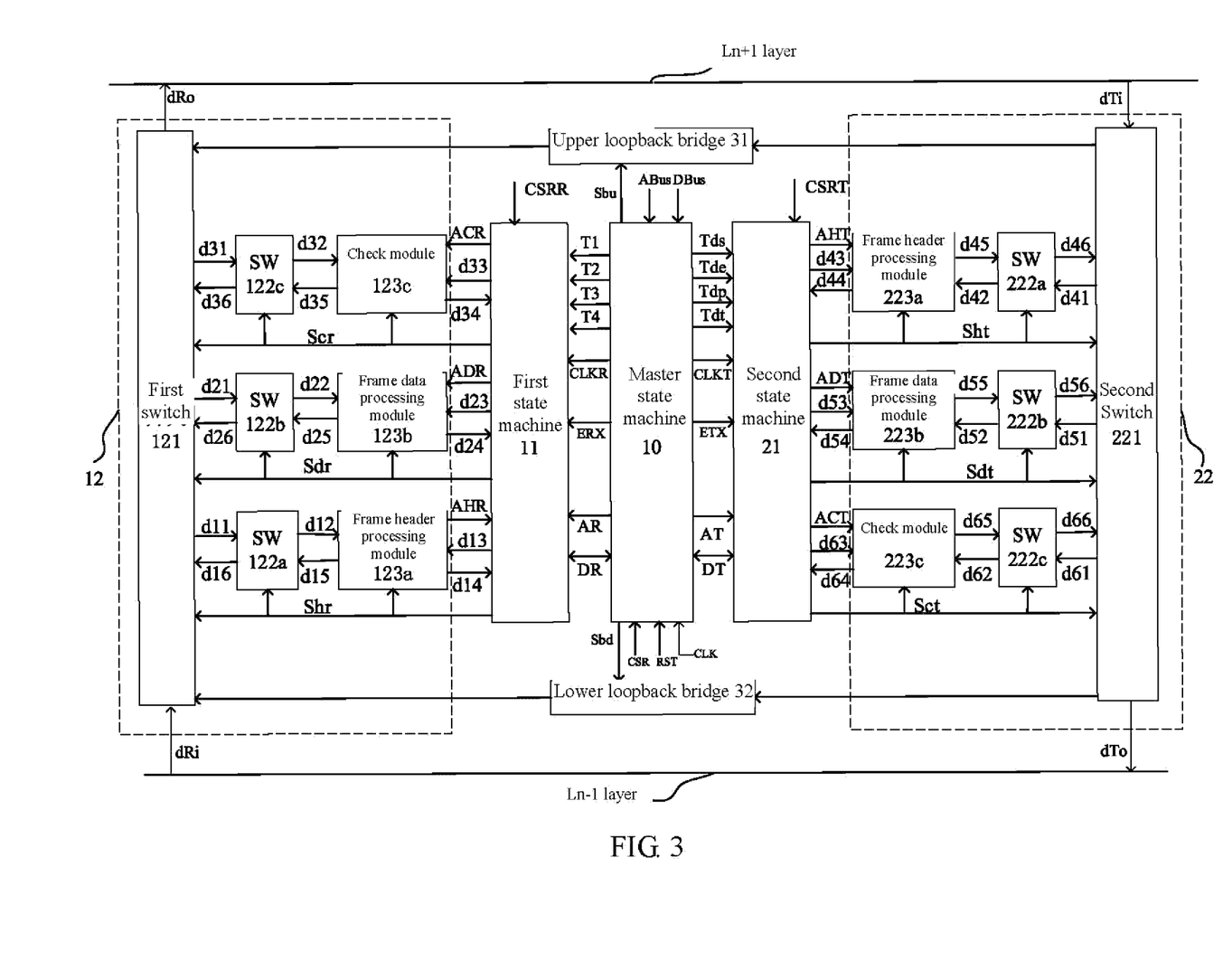
FIG. 3 is a structural schematic diagram of a data processing unit of a present disclosure.

A programmable and reconfigurable frame processor 100 is provided in the present embodiment, which mainly provides a detailed implementation method for the data processing units 12 and 22 in the first and second embodiments. Referring to FIG. 3, in the embodiment, the structures of the first data processing unit 12 and the second data processing unit 22 are the same. In communication process, the data packet or frame comprises the frame header, the frame data and the check data. There are various kinds of check data, such as CRC check data as usual.

Accordingly, the first data processing unit 12 comprises: a first switch 121 configured to switch on or off the receiving and transmitting of the frame/packet of the first data processing unit 12; a frame header switch (SW) 122a connected to the first switch 121 configured to switch on or off the receiving and transmitting of the frame header; a frame header processing module 123a respectively connected to the frame header switch 122a and the first state machine 11 configured to process the frame header under the control of the first state machine 11; a frame data switch 122b connected to the first switch 121 and configured to switch on or off the receiving and transmitting of the frame data; a frame data processing module 123b respectively connected to the frame data switch 122b and the first state machine 11 and configured to process the frame data under the control of the first state machine 11; a check switch 122c connected to the first switch 121 and configured to switch on or off the receiving and transmitting of the check data; and a check module 123c respectively connected to the check switch 122c and the first state machine 11 configured to process the check data under the control of the first state machine 11.

The second data processing unit 22 comprises: a second switch 221 configured to switch on or off the receiving and transmitting of the frame/packet of the second data processing unit 22; a frame header switch 222a connected to the second switch 221 configured to switch on or off the receiving and transmitting of the frame header; a frame header processing module 223a respectively connected to the frame header switch 222a and the second state machine 21 configured to process the frame header under the control of the second state machine 21; a frame data switch 222b connected to the second switch 221 configured to switch on or off the receiving and transmitting of the frame data; a frame data processing module 223b respectively connected to the frame data switch 222b and the second state machine 21 configured to process the frame data under the control of the second state machine 21; a check switch 222c connected to the second switch 221 configured to switch on or off the receiving and transmitting of the check data; and a check module 223c respectively connected to the check switch 222c and the second state machine 21 configured to process the check data under the control of the second state machine 21.

As the structures at the left and right of the master state machine 10 are the same, the detailed operation principle of the structure at the left of the master state machine 10 will be described in the following as an example.

When the state machine enable signal ERX is effective, the first state machine 11 starts to work.

When the enable signal Shr is effective, the first switch 121 and the frame header switch 122a are closed, the frame header processing module 123a is working, d11=dRi, dRo=d16.

When the enable signal Sdr is effective, the first switch 121 and the frame data switch 122b are closed, the frame data processing module 123b is working, d21=dRi, dRo=d26.

When the enable signal Scr is effective, the first switch 121 and the check switch 122c are closed, the check module 123c is working, d31=dRi, dRo=d36.

The structure at the right of the master state machine 10 is similar to the left, as well as the operation principle which will not be described again.

The Fourth Embodiment: A Frame Header Processing Module

Figure 4:
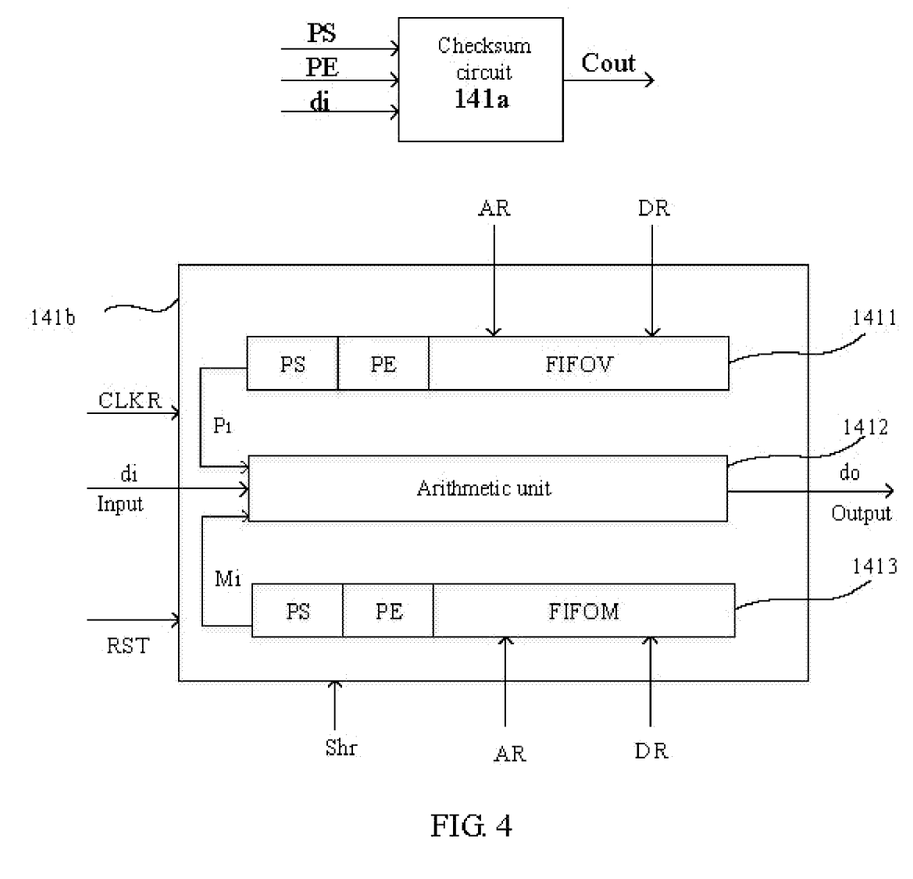
FIG. 4 is a structural schematic diagram of a check module of the present disclosure.

The detailed structure of the frame header processing module is provided in the embodiment, which is suitable for the frame header processing modules 123a and 223a in the third embodiment. Referring to FIG. 4, the frame header processing module comprises a checksum circuit 141a and a condition receiving circuit 141b.

The checksum circuit 141a is used for making checksum of the data pointed from a header address pointer PS to a tail address pointer PE in order to determine whether to receive the current frame or packet. The checksum circuit 141a can use any traditional method to make the checksum based on the frame header address pointer PS, the frame tail address pointer PE and the input data di, which will not be described here. The checksum circuit 141a outputs the result through the signal Cout after making the checking and processing. In different protocols, the checksum of different bits of the input data di should be made, and the bits that should be made checksum can be appointed through the frame header address pointer PS and the frame tail address pointer PE in the present application, so the present application can adapt to any protocol through changing the address pointers.

The condition receiving circuit 141b is used for further determining whether to receive the current frame or packet. Advantageously, the frame structure description tables in the first, second and third embodiments are included in the condition receiving circuit 141b of the frame header processing module.

Specifically, the condition receiving circuit 141b comprises: a FIFO register 1411 configured to store the frame header address pointer PS, the frame tail address pointer PE and values of respective sections specified in a communication protocol; a FIFO register 1413 configured to store the frame header address pointer PS, the frame tail address pointer PE and masks of respective sections specified in a communication protocol; and an arithmetic unit 1412 configured to calculate the frame header (input data di), the values Pi of respective sections specified in the communication protocol and the masks Mi of respective sections specified in the communication protocol of the frame/packet to be received, and output the calculated result do to determine whether to receive the current data.

The operation principle of the condition receiving circuit 141b is as follows.

The frame header address pointer PS, the frame tail address pointer PE and the values of respective sections specified in the communication protocol are modified through the address bus AR and the data bus DR when the reset signal RST is effective or initialized. It starts to work when the enable signal Shr is effective, wherein the output data do=OP (Pi, di, Mi). Wherein, the OP is the operation logic of the arithmetic unit 1412, which is defined based on the demand. For example, the operation logic OP can be: when Mi=0, do=Pi&di (logic and between Pi and di); when Mi=1, di=Pi. In the frame header, the current frame is received if do transports to 1, or otherwise the current frame is discarded.

In the embodiment, the frame header processing module doesn't define any data processing rule of a specific protocol, but purely performs logical operation for the frame header and the protocol sections in the FIFO register 1411, wherein the rule of the logical operation can be defined through changing the masks in the FIFO register 1413. Namely, users can configure the protocol sections in the FIFO register as well as the masks in the protocol sections, and therefore the condition receiving circuit 141b can be reconfigured momentarily to identify any new protocol data through these two configurations. Of course, the frame data structure description tables in the present application can use other technical schemes besides the FIFO register, such as the first-in-first-out, the first-in-last-out, and the circular queue.

The Fifth Embodiment: A Check Module

Figure 5:
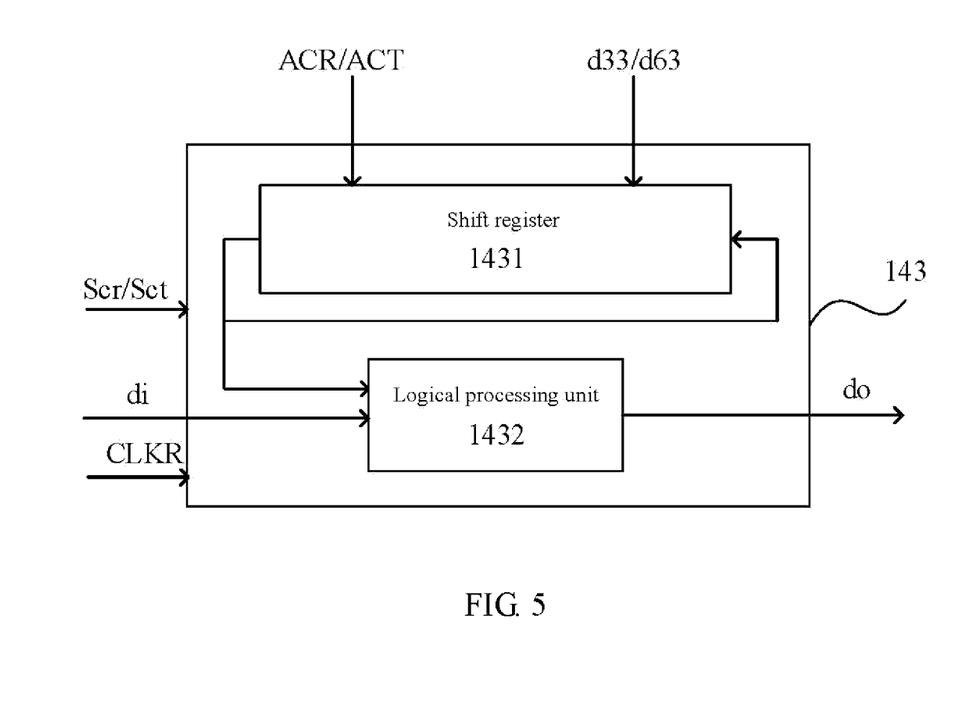
FIG. 5 is a structural schematic diagram of a frame header processing module of the present disclosure.

The detailed structure of the check module 143 is provided in the embodiment, which is suitable for the check modules 123c and 223c in the third embodiment. Referring to FIG. 5, the check module 143 comprises a shift register 1431 and a logical processing unit 1432. Its operation principle is as follows.

The check module 143 works when the enable signal Scr/Sct is effective. The new polynomial is input from d33/d63. The logical processing unit 1432 performs logical operation to check and correct the data based on the new input polynomial and the currently received check data di.

In the embodiment, polynomials suitable for different communication protocols can be configured in the shift register 1431 so long as the shift register 1431 has sufficient storage space. Therefore, the check module in the present application is reconfigurable.

The Sixth Embodiment: A State Machine

Figure 6:
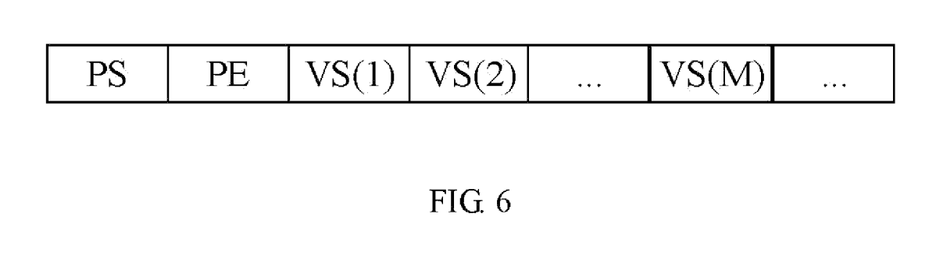
FIG. 6 is a schematic diagram of a protocol state structure description table of the present disclosure.

The detailed data structure and operation principle of the state machine is provided in the embodiment, which is suitable for the first state machine 11, the second state machine 21 and the master state machine 10 in the first, second and third embodiments. FIG. 6 shows the data structure of the protocol state structure description table in the state machine. Referring to FIG. 6, the FIFO register stores the frame header address pointer PS, the frame tail address pointer PE and the state transition values VS(1)~VS(M). In this embodiment, M is the amount of states in the current protocol. The storage space of the FIFO register is large enough to satisfy the demand of state amount in any protocol.

Figure 7:
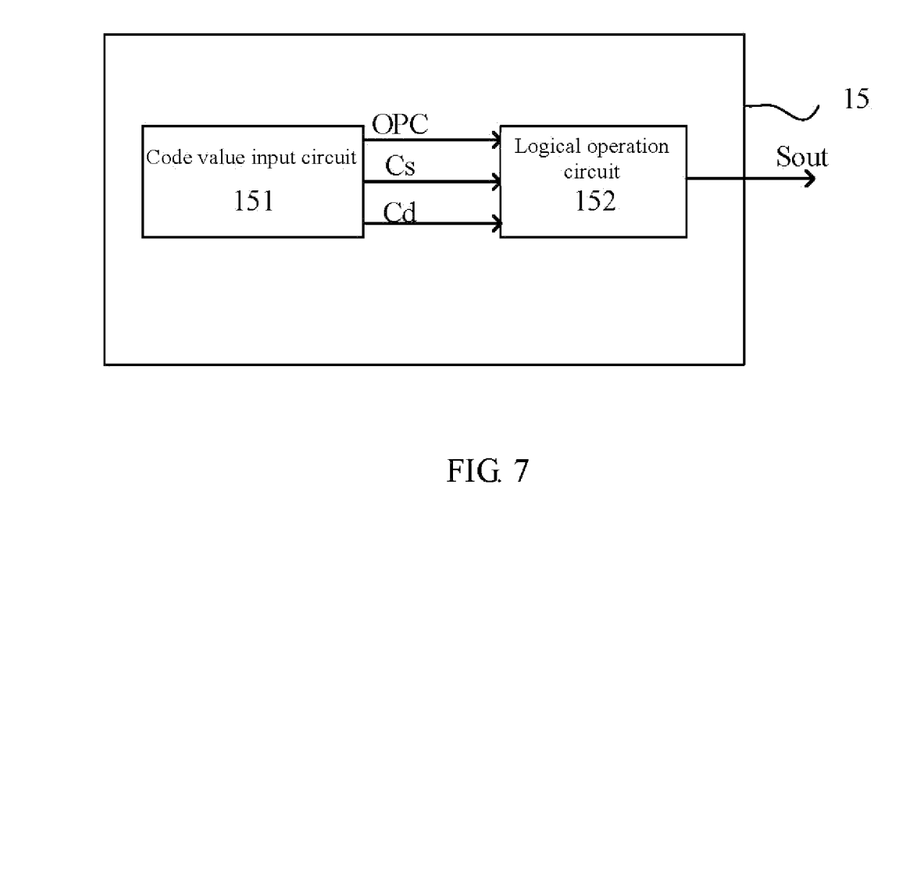
FIG. 7 is a structural schematic diagram of a state transition judging module of the present disclosure.

FIG. 7 shows a structural schematic diagram of a state transition judging module. Referring to FIG. 7, the state transition judging module 15 comprises a code value input circuit 151 and a logical operation circuit 152. The code value input circuit 151 is used for providing a reconfigurable code value that includes an operation code value OPC, a current triggering event source code value Cs and a target event source code value Cd. The operation type of the logical operation circuit 152 can be determined through the operation code value OPC. For example, 4 types of logical operations can be defined if the operation code value OPC is 2 bits, and 8 types of logical operations can be defined if the operation code value OPC is 3 bits. The value of the OPC can be configured by users in order to adapt to different protocols. Cs is used for representing a current event source, and its value can also be configured to adapt to different protocols. Cd is used for representing a target event source, and it is determined whether to transform state under the current event source based on the logical operation between the target event source and the current event source.

Figure 8:
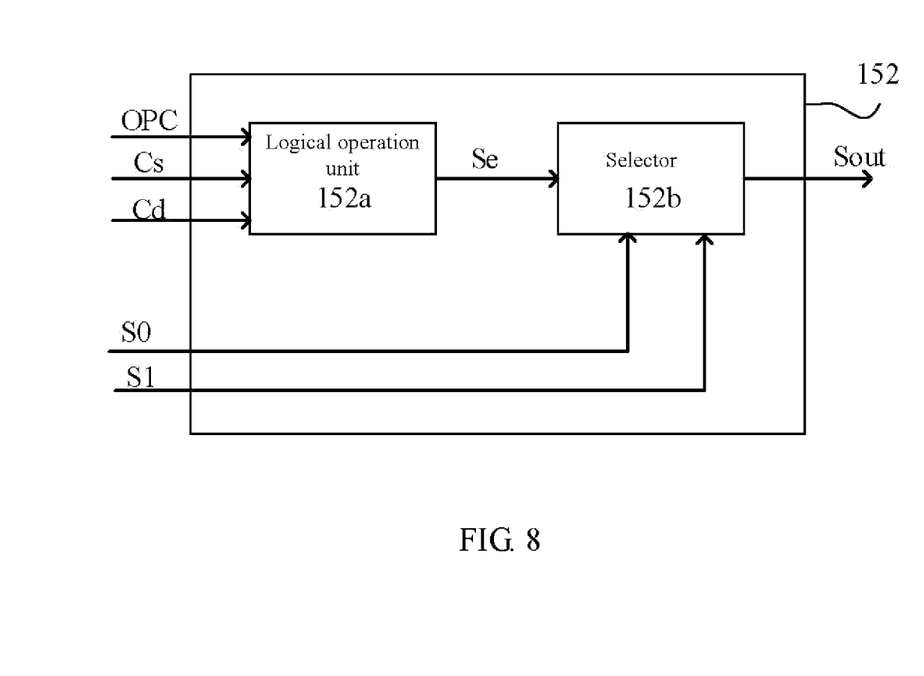
FIG. 8 is a structural schematic diagram of the logical operation circuit in FIG. 7.

Specifically, referring to FIG. 8, the logical operation circuit 152 comprises a logical operation unit 152a and a selector 152b. S0 represents keeping the current state, and S1 represents transforming to a next state. In a detailed embodiment, the value of the OPC can be selected from 00, 01, 10, and 11 when the OPC is 2 bits. The logical operation unit can define 4 kinds of operation methods such as AND, OR, XOR, and NXOR. Of course, the more complicated operation methods can be defined based on the demand. And the logic of the selector 152b can be as follows:

$$Sout = \begin{cases} S1 & \text{if } Se = 1 \text{ (transform to a next state)} \\ S0 & \text{if } Se = 0 \text{ (keep the current state)} \end{cases}$$

It should be understood that, the present embodiment is only one example of various methods to implement the logical operation circuit 152. The skilled in the art can design various suitable implementation methods in the light of the present embodiment according to real demand. It mainly reflects the reconfigurable characteristic of the state machine in the present application.

Therefore, the state transition judging circuit in the state machine is also reconfigurable in the present application. Different state transition models can be reconfigured to adapt to different protocols through inputting different code values.

The Seventh Embodiment: A Programmable Timing Sequence Generator

Figure 9:
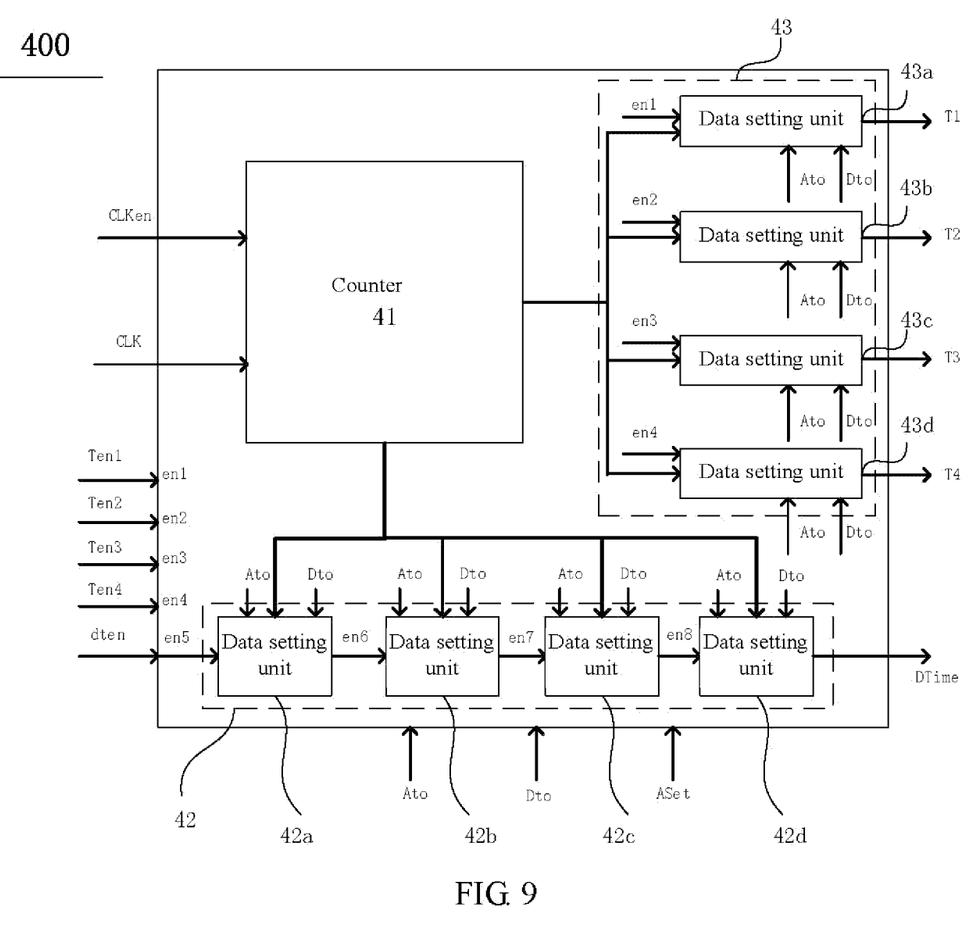
FIG. 9 is a structural schematic diagram of a programmable timing sequence generator of the present disclosure.

The detailed structure of a programmable timing sequence generator 400 is provided in the embodiment, which is used for defining the data receiving and transmitting timing sequence of the data processing modules in the first, second and third embodiments. Referring to FIG. 9, the programmable timing sequence generator 400 comprises a counter 41, a relative delay output module 42 and an independent delay output module 43.

Referring to FIGS. 1-3 and 9, the relative delay output module 42 is connected to the counter 41, which is used for providing a standardized data transmitting timing sequence based on the configured relative delay value, wherein the relative delay value includes a before-data-transmission delay time Tds, an after-data-transmission delay time Tde, a frame protection time Tdp and a channel cycle Tdt. Referring to FIG. 9, the four relative delay values can be configured through four serial data setting units 42a~42d, and the sum DTime of these four relative delay times is output in the end. Therefore, the values of four relative delay times are configurable or programmable according to the timing sequence demands in different communication protocols. The timing sequences can be configured to adapt to different communication protocols through simply configuring the values of four data setting units, since the timing sequences in different protocols are standardized in the present application.

Referring to FIGS. 1-3 and 9, the independent delay output module 43 is connected to the counter 41, which is used for providing at least one independent delay time based on the configured independent delay value in order to provide a data receiving timing sequence. FIG. 9 shows four independent delay times T1~T4. The four independent delay times can be configured through four data setting units 43a~43d in parallel. Of course, the amount of the data setting units is given in the embodiment only for explaining its operation principle, but not for limiting its structure. The skilled in the art can design the amount of the data setting units based on real demand in the light of the present application without creative efforts.

Therefore, the data receiving and transmitting timing sequences can be reconfigured to adapt to different protocols through simply configuring the values of the data setting units by users, since the data receiving and transmitting timing sequence is standardized in the present embodiment.

The above is only the preferred embodiments of the disclosure, but not the limitations to the scope of the disclosure. Any equivalents made within the spirit and principle of the disclosure by the skilled in the art in the light of the whole or part of the processes in above embodiments will fall into the scope of the disclosure.

I claim:

1. A programmable and reconfigurable frame processor, comprising:
   a first data processing unit, configured to receive a first frame/packet from a lower-layer protocol and send a first processed frame/packet to an upper-layer protocol;
   a first state machine connected to the first data processing unit and configured to control operation of the first data processing unit through a finite state transition table;
   a second data processing unit, configured to receive a second frame/packet from the upper-layer protocol and send a second processed frame/packet to the lower-layer protocol;
   a second state machine connected to the second data processing unit and configured to control operation of the second data processing unit through the finite state transition table; and
   a master state machine respectively connected to the first and second stale machines and configured to control operation of the first and second state machines through the finite state transition table;

wherein the first and second data processing units each comprises a frame structure description table for storing a frame header address pointer, a frame tail address pointer and values of respective sections specified in an existing applicable communication protocol; and the first state machine, the second state machine and the master state machine each comprises a protocol state structure description table for storing a header address pointer, a tail address pointer and state transition values.

2. The programmable and reconfigurable frame processor of claim 1, further comprising:

an upper loopback bridge respectively connected to the first and second data processing units and the master state machine and configured to bridge between the first and second data processing units under the control of the master state machine, so as to make the second frame/packet from the upper-layer protocol processed by the second data processing unit, the upper loopback bridge and the first data processing, unit and then sent to the upper-layer protocol.

3. The programmable and reconfigurable frame processor of claim 1, further comprising:

a lower loopback bridge respectively connected to the first and second data processing units and the master state machine and configured to bridge between the first and second data processing units under the control of the master state machine, so as to make the first frame/packet from the lower-layer protocol processed by the first data processing unit, the lower loopback bridge and the second data processing unit and then sent to the lower-layer protocol.

4. The programmable and reconfigurable frame processor of claim 1, wherein, the first data processing unit comprises:

a first switch configured to switch on or off the receiving and transmitting of the first frame/packet of the first data processing unit;

a first frame header switch connected to the first switch and configured to switch on or off the receiving and transmitting of the frame header;

a first frame header processing module respectively connected to the first frame header switch and the first state machine and configured to process the frame header under the control of the first state machine;

a first frame data switch connected to the first switch and configured to switch on or off the receiving and transmitting of the frame data;

a first frame data processing module respectively connected to the first frame data switch and the first state machine and configured to process the frame data under the control of the first state machine;

a first check switch connected to the first switch and configured to switch on or off the receiving and transmitting of the check data; and a first check module respectively connected to the first check switch and the first state machine and configured to process the check data under the control of the first state machine.

5. The programmable and reconfigurable frame processor of claim 4, wherein, the frame structure description table is included in the first frame header processing module.

6. The programmable and reconfigurable frame processor of claim 1, wherein, the second data processing unit comprises:

a second switch configured to switch on or off the receiving and transmitting of the second frame/packet of the second data processing unit;

a second frame header switch connected to the second switch and configured to switch on or off the receiving and transmitting of the frame header;

a second frame header processing module respectively connected to the second frame header switch and the second state machine and configured to process the frame header under the control of the second state machine;

a second frame data switch connected to the second switch and configured to switch on or off the receiving and transmitting of the frame data;

a second frame data processing module respectively connected to the second frame data switch and the second state machine and configured to process the frame data under the control of the second state machine;

a second check switch connected to the second switch and configured to switch on or off the receiving and transmitting of the check data; and a second check module respectively connected to the second check switch and the second state machine and configured to process the check data under the control of the second state machine.

7. The programmable and reconfigurable frame processor of claim 6, wherein, the frame structure description table is included in the second frame header processing module.

8. The programmable and reconfigurable frame processor of claim 5, wherein, the first frame header processing module comprises:

a first checksum circuit configured for checksum of the data pointed from the frame header address pointer to the frame tail address pointer in order to determine whether to receive the current frame/packet; and a first condition receiving circuit configured to further determine whether to receive the current frame/packet;

the first condition receiving circuit comprises;

a first FIFO register configured to store the frame header address pointer, the frame tail address pointer and values of respective sections specified in an existing applicable communication protocol;

a second FIFO register configured to store the frame header address pointer, the frame tail address pointer and masks of respective sections specified in an existing applicable communication protocol; and a first arithmetic unit configured to calculate the frame header, the values of respective sections specified in the existing applicable communication protocol and masks of respective sections specified in the existing applicable communication protocol of the frame/packet to be received, and output the calculated result to determine whether to receive the current frame/packet.

9. The programmable and reconfigurable frame processor of claim 7, wherein, the second frame header processing module comprises:

a second checksum circuit configured for checksum of the data pointed from the frame header address pointer to the frame tail address pointer in order to determine whether to receive the current frame/packet; and a second condition receiving circuit configured to further determine whether to receive the current frame/packet;

the second condition receiving circuit comprises:

a third FIFO register configured to store the frame header address pointer, the frame tail address pointer and values of respective sections specified in an existing applicable communication protocol;

a fourth FIFO register configured to store the frame header address pointer, the frame tail address pointer and masks of respective sections specified in an existing applicable communication protocol; and a second arithmetic unit configured to calculate the frame header, the values of respective sections specified in the existing applicable communication protocol and masks of respective sections specified in the existing applicable communication protocol of the frame/packet to be received, and output the calculated result to determine whether to receive the current frame/packet.

10. The programmable and reconfigurable frame processor of claim 1, wherein, the first state machine, the second state machine and the master state machine each further comprises a state transition judging module for determining the condition to transfer from one state to a next state;

the state transition judging module comprises:
a code value input circuit configured to provide a reconfigurable code value; and
a logical operation circuit configured for logical operation based on the code value provided by the code value input circuit and outputting the operated result to determine whether to transfer to the next state.

11. The programmable and reconfigurable frame processor of claim 10, wherein, the code value comprises:
an operation code value for determining the logical operation type of the logical operation circuit;
a current triggering event source code value for representing a current event source; and
a target event source code value tor representing a target event source.

12. The programmable and reconfigurable frame processor of claim 1, further comprising:
a programmable timing sequence generator for providing a timing sequence signal for the first and second state machines;
the programmable timing sequence generator comprises:
a counter;
a relative delay output module connected to the counter and configured to provide a standardized data transmitting timing sequence based on the configured relative delay value, wherein the relative delay value includes a before-data-transmission delay time, an after-data-transmission delay time, a frame protection time and a channel cycle; and
an independent delay output module connected to the counter and configured to provide at least one independent delay time based on the configured independent delay value in order to provide a data receiving timing sequence.

* * * * *